US005736923A

United States Patent [19]
Saab

[11] Patent Number: 5,736,923
[45] Date of Patent: Apr. 7, 1998

[54] APPARATUS AND METHOD FOR SENSING MOTIONLESSNESS IN A VEHICLE

[75] Inventor: Samer S. Saab, Turtle Creek, Pa.

[73] Assignee: Union Switch & Signal Inc., Pittsburgh, Pa.

[21] Appl. No.: 500,571

[22] Filed: Jul. 11, 1995

[51] Int. Cl.$^6$ ................................. B60R 25/10
[52] U.S. Cl. .................. 340/429; 340/566; 340/689; 180/281; 180/282; 180/271
[58] Field of Search ............... 340/429, 933, 340/689, 566; 73/178 R; 246/187 R; 105/341; 180/281, 282, 280, 271; 307/10.1, 9.1

[56] References Cited

U.S. PATENT DOCUMENTS

| | | | |
|---|---|---|---|
| 3,575,604 | 4/1971 | Smith | 307/9 |
| 3,702,477 | 11/1972 | Brown | 343/112 |
| 3,739,383 | 6/1973 | Perot et al. | 343/112 |
| 4,060,718 | 11/1977 | Huddle | 364/421 |
| 4,205,300 | 5/1980 | Ho et al. | 340/429 |
| 4,267,547 | 5/1981 | Sugiyama | 340/429 |
| 4,359,717 | 11/1982 | Huber et al. | 340/566 |
| 4,679,508 | 7/1987 | Fruehan et al. | 105/341 |
| 4,752,053 | 6/1988 | Boetzkes | 246/167 |
| 5,012,424 | 4/1991 | Dodson | 364/449 |
| 5,332,180 | 7/1994 | Peterson et al. | 246/3 |

FOREIGN PATENT DOCUMENTS

| | | |
|---|---|---|
| 0 389 327 | 9/1990 | European Pat. Off. . |
| A 63-182518 | 2/1988 | Japan . |
| A 63-203454 | 12/1988 | Japan . |

Primary Examiner—Jeffery Hofsass
Assistant Examiner—Julie B. Lieu
Attorney, Agent, or Firm—Buchanan Ingersoll, P.C.

[57] ABSTRACT

An apparatus and method for sensing motionlessness for sensing motionlessness in a land-based vehicle is provided. The apparatus can include an inertial measurement unit (IMU) mounted in a predetermined orientation on the vehicle and a programmable computer. The IMU can have an inertial sensor which generates a plurality of motion signals. More than one inertial sensor can be used and, in that case, each of the sensors can be mounted in a second predetermined orientation with respect to the others, such as an orthogonal orientation, thereby creating a selected spatial reference frame. The inertial sensor can be one or more accelerometers, or one or more gyroscopes, or an accelerometer-gyroscope combination. The computer receives the motion signals and determining a motion state of the vehicle therefrom. The computer provides the motion state to a target application which acts in accordance therewith. The method can include sensing a reference sample of motion signals during a reference period; extracting a reference characteristic signal from the reference sample; sensing an operational sample during an operational period; extracting an operational characteristic signal from the operational sample; determining the current motion state by comparing the operational characteristic signal to the reference characteristic signal; reporting the motion state to a target application in the vehicle, the application acting in accordance therewith.

12 Claims, 4 Drawing Sheets

APPARATUS AND METHOD FOR SENSING MOTIONLESSNESS IN A VEHICLE

BACKGROUND OF THE INVENTION

1. Field of the Invention

The invention herein relates to vehicle sensors, particularly, to vehicle motion sensors, and more particularly, to sensors for determining when a vehicle is at rest, or motionless.

2. Description of the Prior Art

It is often desirable to know when a vehicle is at rest, i.e., be substantially motionless. For example, a light-rail commuter vehicle can require accurate detection of the vehicle's motionlessness so that the vehicle control system or the vehicle operator can open the vehicle doors to permit passengers to enter and depart. Typically, many land-based vehicle applications employ tachometers to measure vehicle velocity. A tachometer is an electromechanical angular speed transducer that can produce an output, e.g., a series of pulses, that is representative of the vehicle's speed. However, at very low speeds, the tachometer output may not be detected or be properly interpreted, leading to an erroneous indication of the vehicle being motionless.

Inertial sensors, for example, gyroscopes and accelerometers, are often used in military and aerospace applications such as navigation, guidance, and weapon fire control. More recently, inertial sensors have been used for guiding vehicle motion in applications such as maneuvering an autonomous delivery robot through hospital corridors, guiding an emergency vehicle deployed in an urban environment, navigating an automated forklift in a warehouse, and so on.

Inertial sensors are useful in land-based applications because, when a land-based vehicle travels between two points, a measurable change in the vehicle's acceleration vector can occur. This acceleration vector can be decomposed into three directions, i.e., forward, lateral, and downward. These three directions are generally orthogonal and can form a spatial reference frame. The change in the forward direction is typically due to variations in the vehicle's desired speed which can result from factors such as land traction, joint stiction, and friction. The change in lateral acceleration can be due to turns, roughness of the land surface, roll in a vehicle, and the like. Furthermore, changes in the downward acceleration may result from vehicle vibration, irregularities in the vehicle path topology, vehicle pitch and roll, and the like. Thus, whenever the vehicle is not at rest, even if the vehicle speed is essentially constant, the acceleration vector usually reflects motions due to the aforementioned effects, as sensed by an inertial sensor. An accelerometer can measure the intensity and direction of an acceleration-produced force, from this, the magnitude and direction of the acceleration vector can be determined. A gyroscope can measure the intensity and direction of angular motion from which velocity vectors can be determined.

By integrating the outputs from an inertial sensor over time, one can determine the sensor's angular displacement and the sensor's linear velocity, respectively. Using time integration, one can determine velocity information and, using an additional time integration, can determine position information. Practically, however, it is difficult to exactly measure a specific vector, for example angular velocity, without introducing or receiving some error. Over time, the errors can accumulate and the reported angular position and linear velocity are likely to diverge. Thus, velocity errors in a system will frequently be appreciable and the inertial navigational system may be unable to autonomously differentiate between the vehicle having a small velocity and the vehicle being at rest. Indeed, apparatus employing inertial sensors typically are employed to measure a vehicle's motion, and not motionlessness, due in part to such cumulative errors.

What is needed then is an apparatus and method for accurately sensing when a vehicle is motionless. In addition, other motion related information such as pitch, roll, yaw and speed also may be provided.

SUMMARY OF THE INVENTION

The invention provides an apparatus and method for sensing motionlessness in a land-based vehicle. The apparatus can include an inertial measurement unit (IMU) mounted in a predetermined orientation on the vehicle and a programmable computer. The IMU can have an inertial sensor which generates a plurality of motion signals. More than one inertial sensor can be used and, in that case, each of the sensors can be mounted in a second predetermined orientation with respect to the others, thereby creating a selected spatial reference frame. In one embodiment, the second predetermined orientation is an orthogonal orientation. The inertial sensor can be one or more accelerometers, or one or more gyroscopes, or an accelerometer-gyroscope combination.

The programmable computer receives the motion signals and determines a motion state of the vehicle therefrom. The motion state can include stopped and moving, where the stopped motion state is indicative of motionlessness. In one embodiment, motionlessness is relative to a predetermined axis of movement, for example, the downward direction. The programmable computer provides the motion state to a target application which acts in accordance therewith. Where the land-based vehicle is a rail vehicle, the target application can be a rail vehicle control system.

A method for practicing the invention in a land-based vehicle having inertial sensors which provide motion signals can include sensing a reference sample representative of the motion signals during a reference period; extracting a reference characteristic signal from the reference sample which can be representative of motionlessness; sensing an operational sample representative of the motion signals during an operational period; extracting an operational characteristic signal from the operational sample which can be representative of a current motion state; determining the current motion state from the operational characteristic signal relative to the reference characteristic signal; reporting the motion state to a target application in the vehicle, the application acting in accordance therewith.

If the motion state is stopped, indicative of motionlessness, then the inertial sensors can be recalibrated and the process repeated with the sensing of a new operational sample. If the motion state is moving, additional operational samples can be taken and analyzed as described until a stopped motion state is detected. The reference characteristic signal can include a first standard deviation representative of the reference sample, and the operational characteristic signal can include a second standard deviation representative of the operational sample.

DETAILED DESCRIPTION OF THE PREFERRED EMBODIMENTS

The invention herein provides an apparatus and method for detecting motionlessness in a vehicle, particularly a land-based vehicle, for example, a rail vehicle. As used herein, motionlessness does not describe the complete lack of movement in a vehicle. Instead, motionlessness can be relative to a predetermined axis of movement, such as forward movement, and can be representative of substantially zero velocity in the direction of that predetermined axis. The apparatus can include an inertial measurement unit (IMU) having one or more inertial sensors that are mounted in a first predetermined orientation on the vehicle. The apparatus can also include a programmable computer for receiving motion signals from the IMU and determining the vehicle's motion state. Where multiple inertial sensors are used, each sensor can be mounted in a second predetermined orientation with respect to the other sensors within the IMU. For example, where three sensors are used, each sensor can be mounted orthogonally with respect to the other sensors so that a three-axis spatial reference frame can be established. An accelerometer can be used as an inertial sensor, although the apparatus instead can employ a gyroscope. Furthermore, multiple accelerometers, gyroscopes, or combinations thereof, also may be used as inertial sensors. Each of the inertial sensors can generate multiple motion signals which can be received by the computer. The computer can, in turn, determine a motion state of the vehicle and provide the motion state to a target application, such as a rail vehicle control system, so that the target application can respond to the motion state. Also, the motion state can be used by the computer for realigning the spatial reference frame and recalibrating the inertial sensors. In general, the motion states determined by the computer can include stopped and moving. The motion state can include the vehicle's speed, and other parameters respective of movement relative to a particular sensor orientation such as pitch, roll, and yaw.

Figure 1:
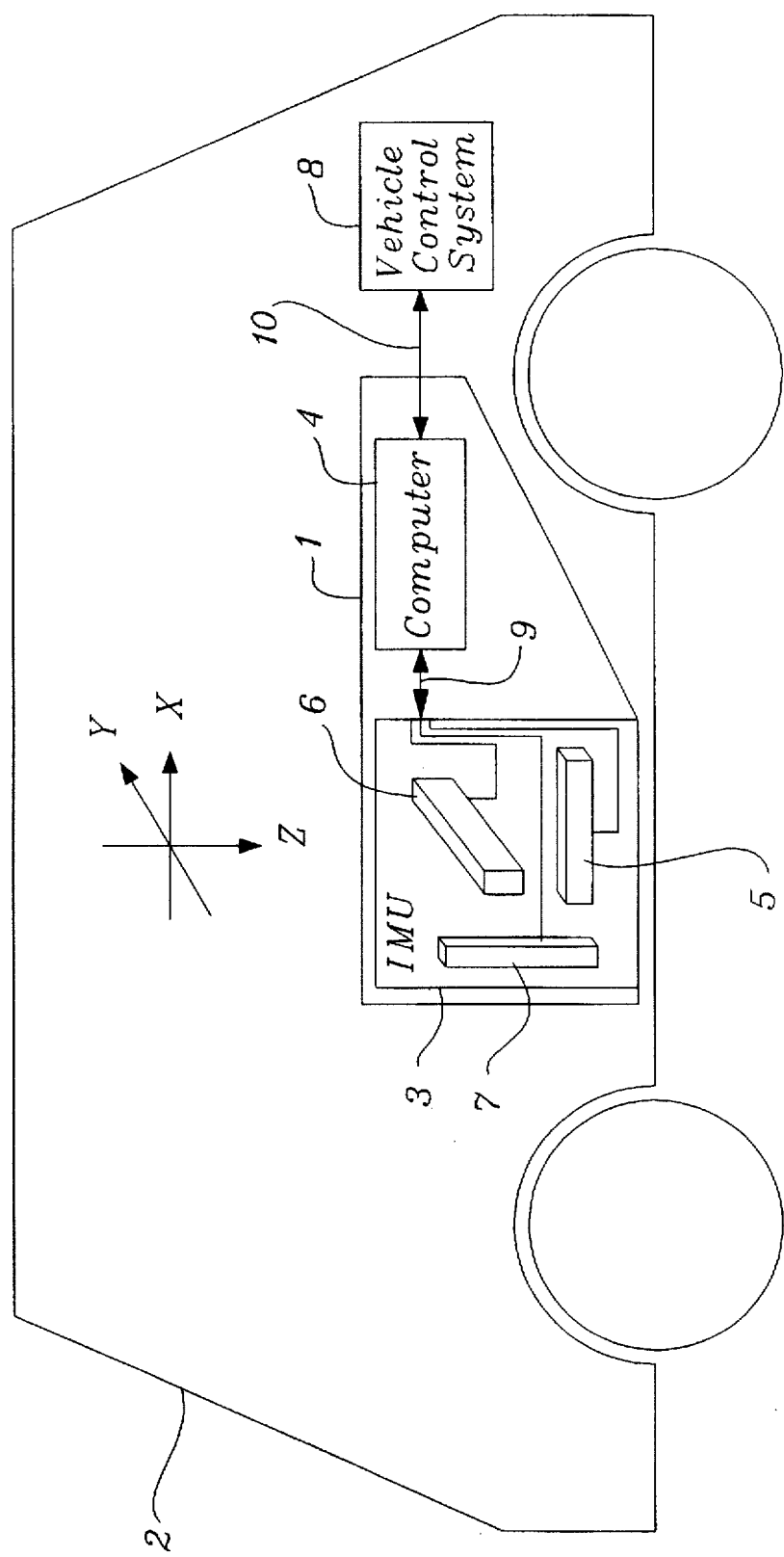
FIG. 1 is a diagram of a land-based vehicle having an apparatus for sensing motionlessness according to the invention herein.

FIG. 1 illustrates one embodiment of apparatus 1 for sensing motionlessness in a vehicle 2 which can include an inertial measurement unit (IMU) 3 and a programmable computer 4. IMU 3 can generate multiple motion signals and can be mounted in a first predetermined orientation on vehicle 2, which can be a land-based vehicle such as, for example, a rail vehicle, a bus, a tram, and the like. Computer 4 is connected to inertial measurement unit 3 and receives multiple motion signals 9 therefrom. Computer 4 can analyze motion signals 9 to determine a motion state of vehicle 2. The motion state can be one of stopped and moving, with the stopped motion state being indicative of motionlessness. Computer 4 can provide the motion state 10 to a target application, which can be vehicle control system 8. IMU 3 can have one or more inertial sensors 5, 6, 7. Each of inertial sensors 5, 6, 7 can be one or more accelerometers or one or more gyroscopes. Alternately, sensors 5, 6, 7 of IMU 3 can include at least one gyroscope and at least one accelerometer. Although a single inertial sensor may be used in IMU 3, multiple inertial sensors also can be used. Where multiple inertial sensors 5, 6, 7 are used, each sensor can be mounted in a second predetermined orientation with respect to the other sensors.

As illustrated in FIG. 1, when IMU 3 employs three inertial sensors 5, 6, 7, the orientation can be an orthogonal orientation, i.e., where each sensor is orthogonal with respect to the others. In such a three-sensor, orthogonal configuration, sensor 5 is oriented to the x-axis and can be used to detect forward motion of vehicle 2. Likewise, sensor 6 is oriented to the y-axis and can be used to sense lateral, or side-to-side, motion in vehicle 2. Sensor 7 is oriented to the z-axis and can detect downward movement in vehicle 2. When a single inertial sensor, such as an accelerometer, is employed in IMU 3, it is preferred that the sensor be oriented as sensor 7, that is, relative to the downward-, or z-, axis of movement.

The invention herein also provides a method for sensing motionlessness in a vehicle and may be used in conjunction with the existing inertial sensors on a vehicle. The method can compensate for dynamic defects such as vehicle and engine, vibration, and random motions such as, for example, passenger movement in the vehicle, an unlevel vehicle platform, or vehicle pathway, and the like. The method includes sensing reference and operational samples of motion signals that are taken during reference and operational periods, respectively. The samples can include the vehicle's acceleration in each of the monitored directions. The reference sample can be taken while the vehicle is at rest, i.e., where the vehicle velocity in a predetermined axis of movement is essentially zero and the vehicle is substantially motionless. From the reference sample can be extracted multiple reference signals including a reference characteristic signal; similarly, from the operational sample can be extracted multiple operational signals including an operational characteristic signal. The method then can provide comparing the operational characteristic signal to the reference characteristic signal to determine a motion state. The motion state can be indicative of whether the vehicle is moving or stopped, and can include selected operational signals. The reference and operational signals can include directional accelerations, pitch, roll, yaw, position, and speed.

In general, the aforementioned characteristic signals can be indicative of the vehicle motion state, and can include the variance of the respective reference and operational directional acceleration vectors. If the vehicle is determined to be motionless, that is, in the stopped motion state, selected ones of the operational signals can be used to align the inertial measurement unit to a selected spatial reference frame and calibrate the inertial sensors. In addition, the stopped motion state information can be used by the target application, for example, the vehicle control system, to activate other devices on the vehicle, including permitting the vehicle doors to open. On the other hand, if the vehicle is determined to be in the moving motion state, another operational sample of the motion signals can be sensed, with multiple operational signals, including characteristic signals, being extracted therefrom, as before. The operational characteristic signal again can be compared to the reference characteristic signal to determine whether the vehicle is moving or stopped.

Figure 2:
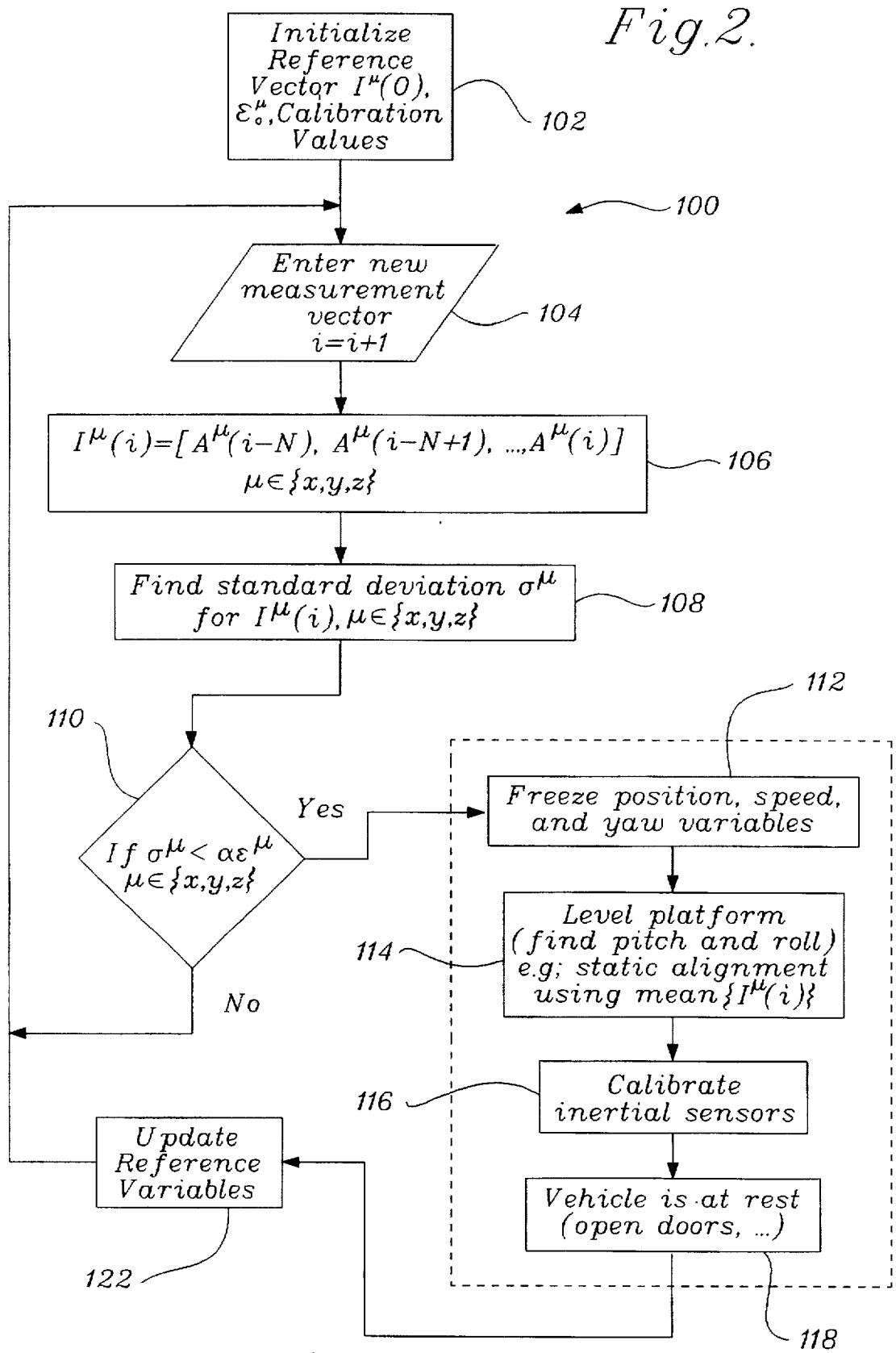
FIG. 2 is a flow diagram of one embodiment of the method for sensing motionlessness according to the invention herein.

FIG. 2 illustrates the method 100 by which the motionlessness of a vehicle can be sensed. At step 102, a programmable computer can sense reference sample from the motion signals generated during a reference period by an inertial measurement device, such as, for example, programmable computer 4 and IMU 3 in FIG. 1. The reference sample can include reference vector $I^\mu(0)$, wherein reference vector $I^\mu(0)$ is obtained while the vehicle is motionless. Generally, vector $I^\mu$ can be an acceleration vector which itself is composed of directional acceleration vectors, e.g., $A^x$, $A^y$, and $A^z$, for each of the three directions sensed by the respective accelerometers. In addition, a reference characteristic signal vector, which can include reference deviation vector $\epsilon^\mu$, is extracted from $I^\mu(0)$ at step 102. A predetermined relaxation factor $\alpha$ can be applied to vector $\epsilon^\mu$ to reduce the effects of noise in the measurement environment. Reference deviation vector $\epsilon^\mu$ can include the standard deviation of the motion signals, taken while the vehicle is at rest. For example, where $\mu \in \{x,y,z\}$, $\epsilon^x$, $\epsilon^y$, $\epsilon^z$ can be the standard deviations of directional acceleration vector $A^x$, $A^y$, $A^z$, respectively, taken while the vehicle is at rest. Similarly, where the inertial sensors include gyroscopes, vector $\epsilon^\mu$ also can include the standard deviation of the respective directional angular velocities sensed thereby.

After initialization at step 102, an operational sample can be collected from the motion signals of the aforementioned inertial measurement device during an operational period, at step 104. To reduce the influence of high-magnitude transient movements upon the operational sample, a moving-window sample vector can be employed for each of directional signal vectors $I^x(i)$, $I^y(i)$ and $I^z(i)$, at step 106. A moving-window sample vector can be provided by deleting the oldest data, i.e., the data with the lowest time index (i) value, and adding to the vector the most recently collected operational sample, so that the total number of samples, N, is maintained. For example, as indicated in step 106, the sample vector in the x-direction at time i is:

$$I^x(i)=[A^x(i-N), A^x(i-N+1), A^x(i)]$$

where $A^x(i)$ is the acceleration value for the x-direction obtained when time i=(i-N), (i-N+1), and (i), respectively. From the moving-window sample, vector $I^\mu(i)$, can be extracted an operational characteristic signal vector, step 108. The operational characteristic signal vector can include a standard deviation vector, $\sigma^\mu$, for each of directional vectors, $I^x$, $I^y$, and $I^z$, in $I^\mu$; mean estimates for each vector; as well as measures of pitch, roll, yaw, speed, and position.

Under typical operational conditions, i.e., when the vehicle is moving, the magnitude of standard deviation vector $\sigma^\mu$ of sample vector $I^\mu$ can be large when compared to the reference deviation vector $\epsilon^\mu$. Although the standard deviation for a single directional vector, e.g., $I^x(i)$, may be used to detect motionlessness, the standard deviations of a plurality of directional vectors e.g., $I^x(i)$, $I^y(i)$, and $I^z(i)$, can be used to further enhance the motion state determination at step 110. When the operational characteristic signal is generally less than the reference characteristic signal, at step 110, a stopped motion state can be detected. It is desirable to use a characteristic signal based on a higher-order measure, such as a standard deviation, because the mean values of vectors $I^\mu(i)$ can be influenced by differences in the vehicle (platform) orientation with respect to a selected spatial reference frame at different measurement times.

If the operational characteristic signal vector, e.g., $\sigma^\mu$ is less than a reference characteristic signal vector, e.g., $\alpha\epsilon^\mu$, then the operational signal vectors can be frozen, step 112, as determined at the time the current stopped state was detected, i.e., at step 110. These operational signal vectors can be used to perform realignment of the vehicle to a selected spatial reference frame, for example, levelling of the platform, step 114. Static alignment can be performed using the mean values of directional vector $I^\mu(i)$. Furthermore, while the vehicle remains at rest, the inertial sensors can be recalibrated, step 116, to accommodate current operational conditions which can vary due to physical conditions, such as, temperature, pressure, humidity, and the like.

The stopped motion state can be used by the target application, for example, vehicle control system 8 in FIG. 1, to perform preselected vehicle functions such as opening the vehicle doors, at step 118. Selected reference variables, can be updated, step 122, as needed, to properly reflect current operational conditions. Process 100 can continue by sensing a new operational sample at step 104. Likewise, if, at step 110, the vehicle motion state is determined to be moving, process 100 continues by sensing a new sample at step 104.

EXAMPLE

A land-based vehicle, i.e., a van, was used to demonstrate the invention herein. An inertial measurement unit, similar to IMU 3 in FIG. 1, was mounted in the van, and included three orthogonally-mounted accelerometers and three orthogonally-mounted gyroscopes, as illustrated in FIG. 1. The x-direction inertial sensors were oriented to measure forward motion, the y-direction sensors were oriented to measure lateral or side-to-side motion, and the z-direction sensors were oriented to measure downward motion. The inertial measurement signals, here analog signals, were received by a programmable computer, similar to programmable computer 4 in FIG. 1. In the computer, IMU motion signals were digitized, and stored in the computer for analysis. The van was maintained at rest for an initialization period, was accelerated generally smoothly for a time, and then decelerated until a full stop was reached. Sampling continued for several seconds after the van came to a rest.

Figure 3A:
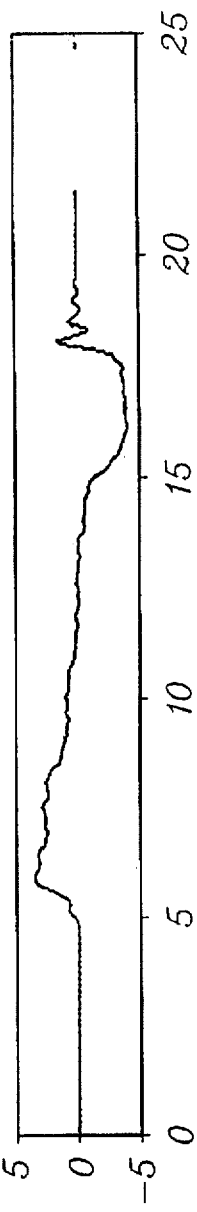
FIG. 3a is a time-based acceleration plot for measured values of forward motion coupled with the projection of gravity on forward acceleration.
Figure 3B:
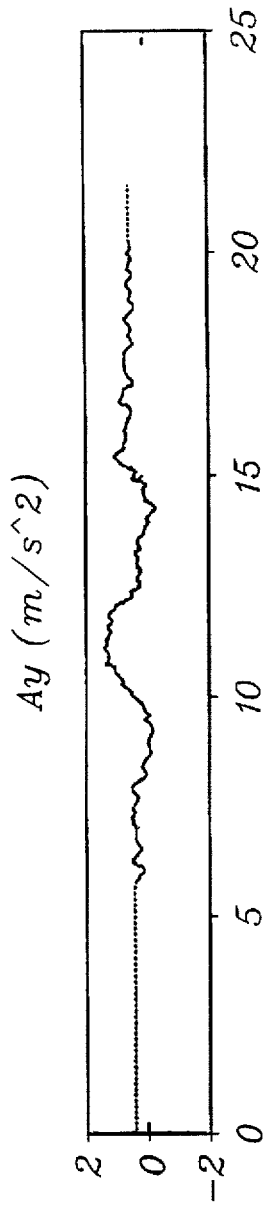
FIG. 3b is a time-based acceleration plot for measured values of lateral motion coupled with the projection of gravity on lateral acceleration.
Figure 3C:
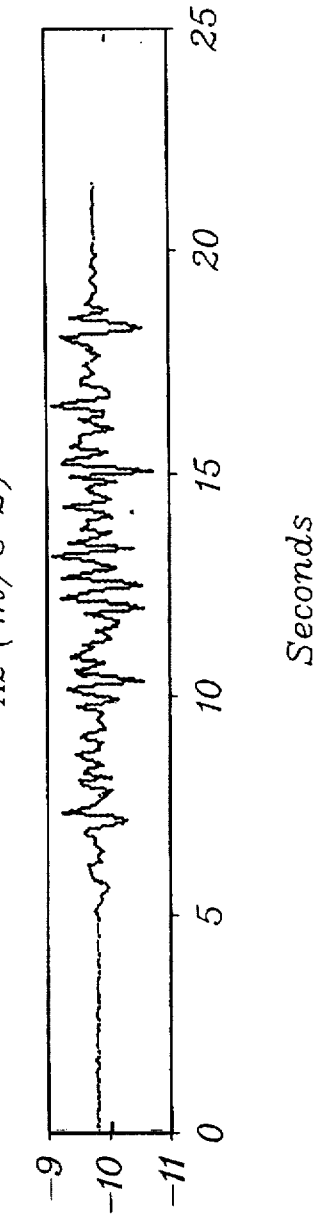
FIG. 3c is a time-based acceleration plot for measured values of a downward motion coupled with the projection of gravity on downward acceleration.
Figure 4A:
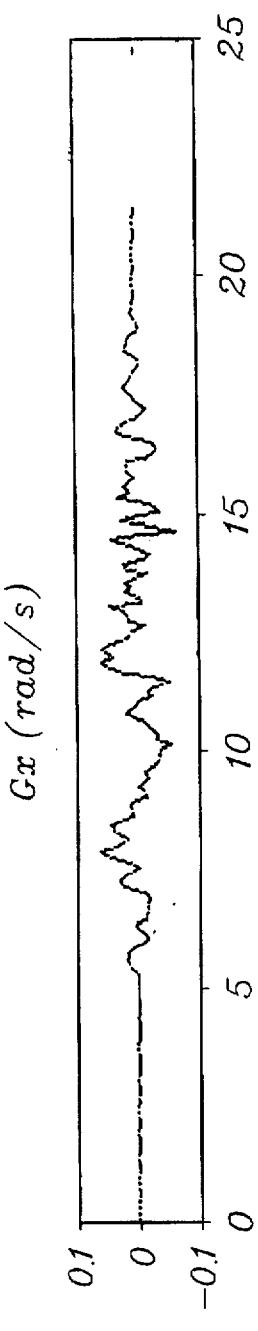
FIG. 4a is a time-based angular velocity plot for measured values of vehicle rolling motion coupled with the earth-rate projection on the roll gyroscope.
Figure 4B:
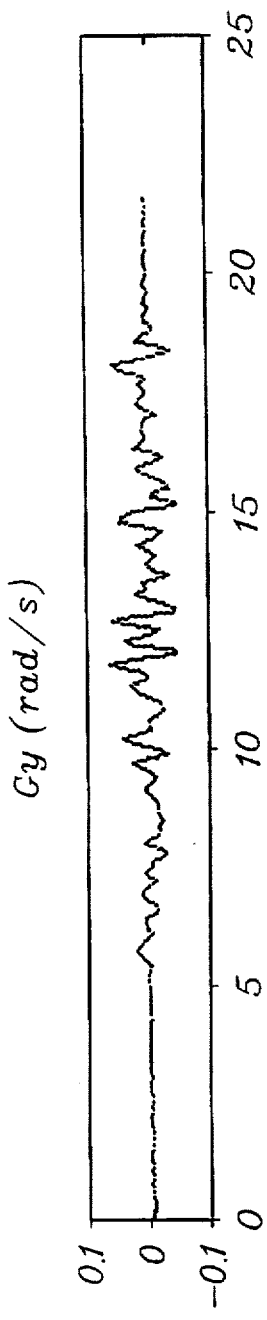
FIG. 4b is a time-based angular velocity plot for measured values of vehicle pitch motion coupled with the earth-rate projection on the pitch gyroscope.
Figure 4C:
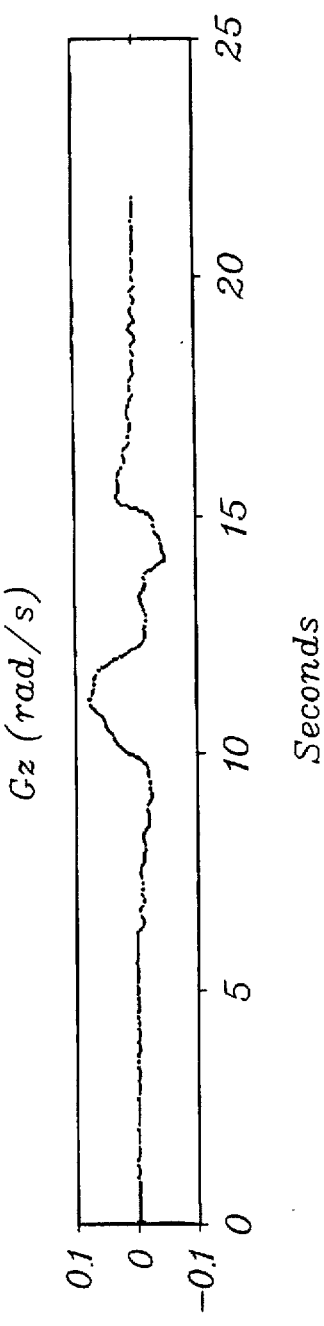
FIG. 4c is a time-based angular velocity plot for measured values of downward motion coupled with the earth-rate projection on the yaw gyroscope.

FIGS. 3a–c are graphical representations of the acceleration forces measured in the x, y, and z directions by the respective accelerometers. FIGS. 4a–c are graphical representations of the angular velocities measured in the x, y, and z directions by the respective gyroscopes. As can be seen in FIGS. 3a–c and 4a–c, the van was at rest during approximately the first five (5) seconds of measurement. The van also can be seen in FIGS. 3a–c and 4a –c to be at rest at about 18.5 seconds after sampling began. Because of the substantial variances between measurements taken while the van was moving and when it was stopped, a higher-order measure, such as a standard deviation, can be used to detect when the vehicle is at rest.

Higher-order measures can be especially useful in rugged environments, such as those of rail vehicles, where the magnitude of the vehicle motion signals can be large, particularly when the vehicle is moving. In such cases, motion signal variances derived from a moving vehicle can be substantially greater than variances derived from the vehicle while at rest. Thus, motionlessness can be detected rapidly and accurately using higher-order measures, such as standard deviations, even in environments more hostile than those encountered by the van in the example.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limited to the scope of the invention which is to be given the full breadth of the following claims and any and all embodiments thereof.

I claim:

1. A method for sensing motionlessness in a land-based vehicle having inertial sensors, each of said sensors providing motion signals, comprising the steps of:

(a) sensing a reference sample representative of said motion signals during a reference period;

(b) extracting a reference characteristic signal from said reference sample, said reference characteristic signal further being representative of motionlessness;

(c) sensing an operational sample representative of said motion signals during an operational period;

(d) extracting an operational characteristic signal from said operational sample, said operational characteristic signal further being representative of a current motion state;

(e) determining said current motion state from said operational characteristic signal relative to said reference characteristic signal, said motion state being one of stopped and moving, said stopped state being indicative of motionlessness;

(f) reporting said motion state to a target application in said vehicle, said target application acting in accordance therewith;

(g) if said motion state is moving, then repeating steps (c) through (h);

(h) if said motion state is stopped, then recalibrating said inertial sensors, and repeating steps (c) through (h); and wherein said reference characteristic signal includes a first standard deviation representative of said reference sample, and said operational characteristic signal includes a second standard deviation representative of said operational sample.

2. The method of claim 1 wherein each of said inertial sensors are mounted in a predetermined orientation respective of others of said inertial sensors, said orientation providing a selected spatial reference frame thereby.

3. The method of claim 2 wherein said predetermined orientation is an orthogonal orientation.

4. The method of claim 1 wherein said motionlessness is relative to a predetermined axis of movement.

5. The method of claim 4 wherein said predetermined axis of movement is the forward axis.

6. The method of claim 4 wherein said predetermined axis of movement is the downward axis.

7. The method of claim 1 wherein said operational characteristic signal includes at least one of vehicle pitch, and vehicle roll, and vehicle yaw, and vehicle velocity and vehicle position.

8. The method of claim 1 wherein said land-based vehicle is a rail vehicle and said target application is a rail vehicle control system.

9. The method of claim 1 wherein said inertial sensors are accelerometers.

10. The method of claim 1 wherein said inertial sensors are gyroscopes.

11. The method of claim 1 wherein said inertial sensors include at least one accelerometer and at least one gyroscope.

12. A method for sensing motionlessness in a land-based vehicle having inertial sensors, each of said sensors providing motion signals, comprising the steps of:

(a) sensing a reference sample representative of said motion signals during a reference period;

(b) extracting a reference characteristic signal from said reference sample, said reference characteristic signal further being representative of motionlessness;

sensing an operational sample representative of said motion signals during an operational period;

(d) extracting an operational characteristic signal from said operational sample, said operational characteristic signal further being representative of a current motion state;

(e) determining said current motion state from said operational characteristic signal relative to said reference characteristic signal, said motion state being one of stopped and moving, said stopped state being indicative of motionlessness;

(f) reporting said motion state to a target application in said vehicle, said target application acting in accordance therewith;

(g) if said motion state is moving, then repeating steps (c) through (h);

(h) if said motion state is stopped, then recalibrating said inertial sensors, and repeating steps (c) through (h);

wherein each of said inertial sensors are mounted in a predetermined orientation respective of others of said inertial sensors, said orientation providing a selected spatial reference frame thereby; and wherein step (h) further comprises at least one of realigning said selected spatial reference frame and selectively revising said reference characteristic signal.

* * * * *